(12) United States Patent
Dusanapudi et al.

(10) Patent No.: US 9,128,887 B2
(45) Date of Patent: Sep. 8, 2015

(54) USING A BUFFER TO REPLACE FAILED MEMORY CELLS IN A MEMORY COMPONENT

(75) Inventors: Manoj Dusanapudi, Bangalore (IN); Prasanna Jayaraman, Bangalore (IN); Anil B. Lingambudi, Bangalore (IN); Girisankar Paulraj, Chennai (IN); Saravanan Sethuraman, Bangalore (IN); Diyanesh B. Vidyapoornachary, Bangalore (IN)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 225 days.

(21) Appl. No.: 13/589,487

(22) Filed: Aug. 20, 2012

(65) Prior Publication Data

US 2014/0053016 A1    Feb. 20, 2014

(51) Int. Cl.
G06F 11/16    (2006.01)

(52) U.S. Cl.
CPC ............ *G06F 11/16* (2013.01); *G06F 11/1666* (2013.01)

(58) Field of Classification Search
CPC ............ G06F 11/1666; G06F 11/1072; G06F 12/0638
USPC ................................. 714/6.1, 6.13, 6.32, 710
See application file for complete search history.

(56) References Cited

U.S. PATENT DOCUMENTS

| | | | |
|---|---|---|---|
| 5,758,056 A * | 5/1998 | Barr | 714/6.32 |
| 6,467,048 B1 * | 10/2002 | Olarig et al. | 714/6.32 |
| 6,567,950 B1 | 5/2003 | Bertin et al. | |
| 6,615,375 B1 * | 9/2003 | Mounes-Toussi et al. | 714/54 |
| 7,055,054 B2 | 5/2006 | Olarig | |
| 7,085,971 B2 | 8/2006 | Barth, Jr. et al. | |
| 7,243,190 B2 * | 7/2007 | Ash et al. | 711/113 |
| 7,293,199 B1 | 11/2007 | Zarrineh et al. | |
| 7,770,077 B2 | 8/2010 | Arimilli et al. | |
| 7,840,860 B2 | 11/2010 | Alves et al. | |
| 7,996,710 B2 * | 8/2011 | Nagaraj et al. | 714/6.1 |
| 8,132,045 B2 * | 3/2012 | Avila et al. | 714/6.21 |
| 8,190,951 B2 * | 5/2012 | Gille | 714/723 |

(Continued)

OTHER PUBLICATIONS

Ramaswamy et al., "Customizable Fault Tolerant Caches for Embedded Processors", International Conference on Computer Design, Oct. 2006, pp. 108-113, IEEE.org, Digital Object Identifier: 10.1109/ICCD.2006.4380780.

(Continued)

*Primary Examiner* — Joseph Schell
(74) *Attorney, Agent, or Firm* — Edward J. Lenart; Katherine S. Brown; Kennedy Lenart Spraggins LLP

(57) ABSTRACT

Methods and data processing systems for using a buffer to replace failed memory cells in a memory component are provided. Embodiments include determining that a first copy of data stored within a plurality of memory cells of a memory component contains one or more errors; in response to determining that the first copy contains one or more errors, determining whether a backup cache within the buffer contains a second copy of the data; and in response to determining that the backup cache contains the second copy of the data, transferring the second copy from the backup cache to a location within an error data queue (EDQ) within the buffer and updating the buffer controller to use the location within the EDQ instead of the plurality of memory cells within the memory component.

20 Claims, 5 Drawing Sheets

(56) References Cited

U.S. PATENT DOCUMENTS

| | | | |
|---|---|---|---|
| 8,418,030 B2* | 4/2013 | Chen et al. | 714/764 |
| 8,612,797 B2* | 12/2013 | Thayer et al. | 714/6.13 |
| 8,688,934 B1* | 4/2014 | Sardella et al. | 711/162 |
| 2006/0080572 A1* | 4/2006 | Fong | 714/8 |
| 2008/0270826 A1* | 10/2008 | Shaw et al. | 714/6 |
| 2010/0121992 A1* | 5/2010 | Chen | 710/26 |

OTHER PUBLICATIONS

Li et al., Enabling Memory Reliability, Availability, and Serviceability Features on Dell PowerEdge Servers, Dell Power Solutions, Aug. 2005, pp. 1-4, Dell Inc., USA.

Moore, "Log-Based Transactional Memory", PhD dissertation 2007, pp. 1-120, University of Wisconsin at Madison Madison, WI, USA.

* cited by examiner

USING A BUFFER TO REPLACE FAILED MEMORY CELLS IN A MEMORY COMPONENT

BACKGROUND OF THE INVENTION

1. Field of the Invention

The field of the invention is data processing, or, more specifically, methods and data processing systems for using a buffer to replace failed memory cells in a memory component.

2. Description of Related Art

Computer system designs are intended to run for extremely long periods of time without failing or needing to be powered down to replace faulty components. However, over time memory cells in chips of a memory module can fail and potentially cause errors when data within the memory chips are accessed. These individual bad memory cells can result in large blocks of memory being taken out of memory maps for the memory system. Further, the loss of the memory can lead to performance issues in the computer system and result in a computer system repair action to replace faulty components.

SUMMARY OF THE INVENTION

Methods and data processing systems for using a buffer to replace failed memory cells in a memory component are provided. Embodiments include determining that a first copy of data stored within a plurality of memory cells of a memory component contains one or more errors; in response to determining that the first copy contains one or more errors, determining whether a backup cache within the buffer contains a second copy of the data; and in response to determining that the backup cache contains the second copy of the data, transferring the second copy from the backup cache to a location within an error data queue (EDQ) within the buffer and updating the buffer controller to use the location within the EDQ instead of the plurality of memory cells within the memory component.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
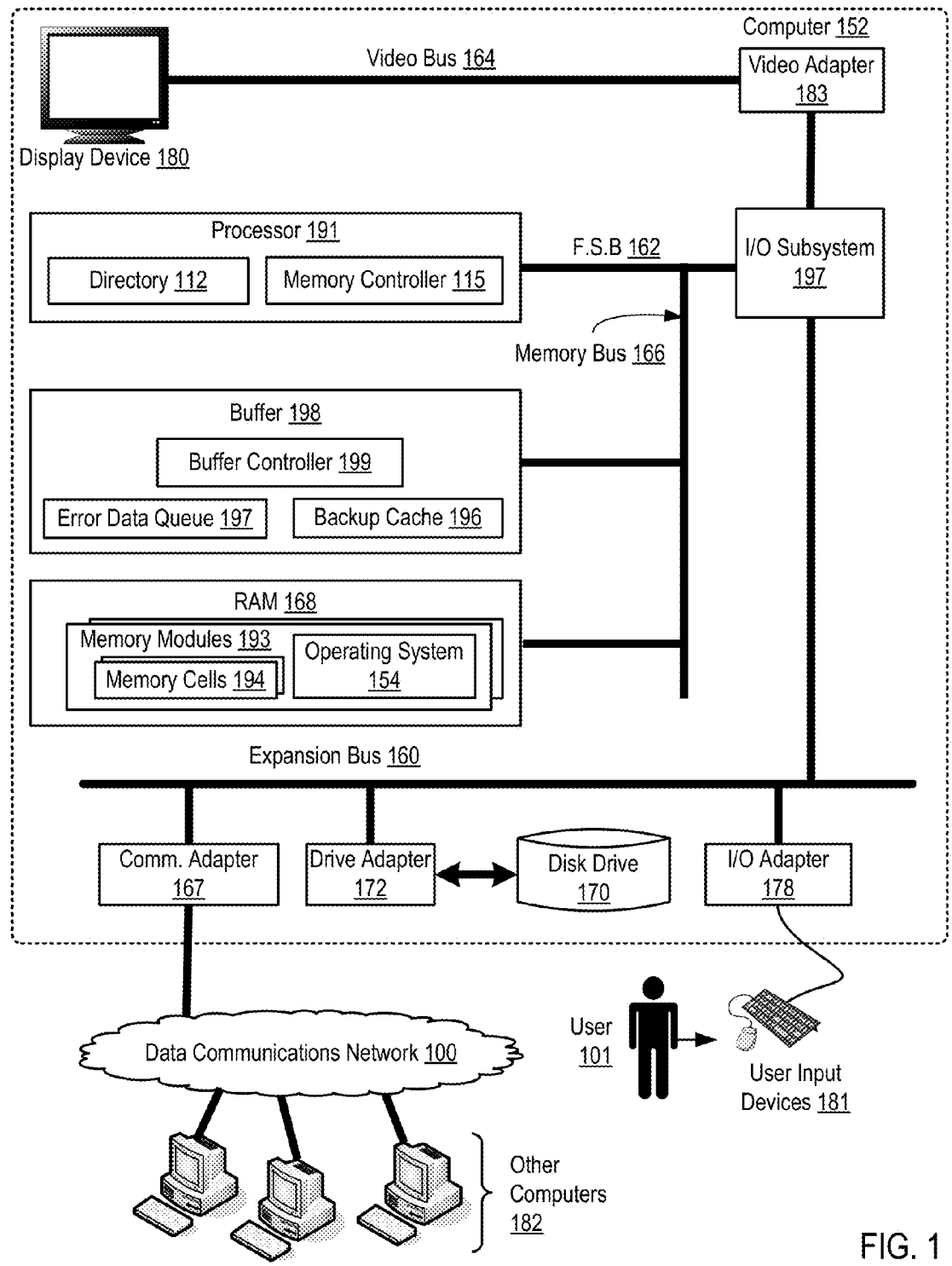
FIG. 1 sets forth a functional block diagram of an example of a computer configured to use a buffer to replace failed memory cells in a memory component according to embodiments of the present invention.

Exemplary methods and data processing systems for using a buffer to replace failed memory cells in a memory component in accordance with the present invention are described with reference to the accompanying drawings, beginning with FIG. 1. FIG. 1 sets forth a functional block diagram of an example of a computer configured to use a buffer to replace failed memory cells in a memory component according to embodiments of the present invention.

The computer (152) of FIG. 1 includes a processor (191) that is coupled to an input/output (I/O) subsystem (197) via a front side bus (162). Connection to the front side bus (162) enables the processor (191) to access other components of the computer (152). For example, the computer (152) of FIG. 1 includes random access memory (RAM) (168) and a buffer (199), both of which are connected through a high speed memory bus (166) to the processor (191) and to other components of the computer (152).

In the example of FIG. 1, the RAM (168) includes memory modules (193) comprising memory cells (194). Although only two memory modules with two memory cells are illustrated, readers of skill in the art will realize that the RAM (168) may be composed of any number of memory modules, each of which may include any number of memory cells. A memory module is an integrated circuit package containing a plurality of memory cells for storage of data. Examples of memory modules include a dual in-line memory module (DIMM), single in-line memory module (SIMM), or other memory module card structure. In general, a DIMM refers to a small circuit board or substrate that is comprised primarily of random access memory (RAM) integrated circuits, or dies, on one or both sides, i.e. planar surfaces, of the circuit board/substrate with signal and/or power pins along both sides of a common edge of the circuit board/substrate. A SIMM refers to a small circuit board or substrate composed primarily of RAM integrated circuits, or dies, on one or both sides, i.e. planar surfaces, of the circuit board/substrate and pins generally along both long edges, with each pin connected to the pin directly (or slightly offset from the pin) on the adjacent side.

The RAM (168) may be one type of memory used by the computer (152) to store programs and data. The RAM (168) may provide temporary read/write storage while hard disks offer semi-permanent storage. For example, stored in the RAM (168) in one or more of the memory modules (193) is an operating system (154). Operating systems useful for using a buffer to replace failed memory cells in a memory component according to embodiments of the present invention include UNIX™, Linux™, Microsoft XP™, AIX™, IBM's i5/OS™, and others as will occur to those of skill in the art. The operating system (154) in the example of FIG. 1 is shown in the RAM (168), but many components of such software typically are stored in non-volatile memory also, such as, for example, on a disk drive (170).

The term random in RAM derives from the fact that a processor may retrieve data from any individual location, or address, within RAM. Most RAM is volatile, which means that it requires a steady flow of electricity to maintain its contents. As soon as the power is turned off, whatever data was in RAM is lost. Volatile random access memory (RAM)

devices may be further divided into two categories, including static random access memory (SRAM) and dynamic random access memory (DRAM). SRAM may be comprised of flip-flop latches, which each retain one bit of data for as long as power is maintained, while DRAM may be comprised of one or more memory cells. Each memory cell may be made up from one transistor and a capacitor. RAM is usually used to designate a data memory having a multiplicity of memory cells, each of which may store a datum and which can be accessed selectively and directly to selectively write in or read out data. RAMs, such as SRAM or DRAM, generally comprise a multiplicity of addresses for writing therein data. Data in the addresses may be accessed, for example, through data latches for performing operations, e.g., programming, on a memory cell array, e.g., a non-volatile memory cell array.

Over time, memory cells in a memory module may fail and potentially cause errors when accessed. These individual bad memory cells may result in large blocks of memory being taken out of the memory maps used by the processor (191) to store and read data. Further, the loss of all or a portion of the RAM (168) may lead to performance issues in the computer (152) and result in a data processing system repair action to replace faulty components. In order to reduce performance issues within the computer (152) and reduce repair actions due to memory cell failure, the illustrative embodiments use a buffer to replace failed memory cells in a memory component.

The buffer (198) of FIG. 1 includes a backup cache (196), an error data queue (EDQ) (197), and a buffer controller (199). A backup cache is a type of memory configured to store data already stored in memory cells of another memory component such as the RAM (168) or store data to be written to the RAM (168). An EDQ is an additional storage area of the buffer that serves as a replacement storage location to data previously stored in RAM. A buffer controller is a combination of circuitry that controls transfers of data within the buffer (198). For example, in response to a memory controller (115) issuing a command to write data to the RAM (168), the buffer controller (199) may write a first copy of the data to the RAM (168) and a second copy of the data to the backup cache (198). The second copy of the data may remain in the backup cache (198) for a predetermined time before being flushed. That is, the buffer acts as an additional temporary storage for data that is written to the RAM (168). If memory cells containing the first copy of the data fail and the backup cache still contains the second copy of the data, the second copy of the data stored in the buffer may be used to replace the data. Although the data is preserved, the original storage location (the plurality of memory cells) is no longer a safe storage location for the data. In these cases, the buffer controller (199) is configured to use the buffer to replace failed memory cells in a memory component. Specifically, the buffer controller (199) is configured to in response to determining that the backup cache contains the second copy of the data, transfer the second copy from the backup cache to a location within an error data queue (EDQ) within the buffer and update the buffer controller to use the location within the EDQ instead of the plurality of memory cells within the memory component. That is, the location within the EDQ replaces the plurality of memory cells of the memory component. While the first copy may have any number of errors and be uncorrectable, because the second copy is stored in the backup cache, the data may be preserved in the EDQ.

In cases where the second copy of the data has been flushed from the backup cache and there are one or more errors in the first copy, the buffer controller is also configured to correct the errors if they are correctable. If the errors are uncorrectable, the buffer controller creates an entry within the EDQ and updates the buffer controller to use the location of the entry within the EDQ instead of the plurality of memory cells. Thus, the memory cells are replaced with a location within the buffer. While the data with uncorrectable errors may be lost and applications requesting this data may crash, other applications issuing future commands referencing the plurality of memory cells may not crash as the memory controller uses the location within the EDQ to store the data associated with the future commands.

The memory controller (115) of FIG. 1 translates system requests for memory access into packets according to one or more communication protocols. Typically, memory write packets contain at least a command, address, and associated data. Memory read packets typically contain at least a command and address, and imply that an expected packet will be returned which contains the requested data and/or information related to the read packet. A memory controller is configured to transmit the read packets and write packets to memory modules within the memory via a memory bus. In the example of FIG. 1, the memory controller (115) is configured to use the buffer controller (199) to access the backup cache (196), the EDQ (197), and the plurality of memory modules (193).

The computer (152) of FIG. 1 includes disk drive adapter (172) coupled through expansion bus (160) to the processor (191) and other components of the computer (152). Disk drive adapter (172) connects non-volatile data storage to the computer (152) in the form of disk drive (170). Disk drive adapters useful in computers for using a buffer to replace failed memory cells of a memory component according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (183), which is an example of an I/O adapter specially designed for graphic output to a display device (180) such as a display screen or computer monitor. Video adapter (183) is connected to the processor (191) through a high speed video bus (164) and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for using a buffer to replace failed memory cells of a memory component according to embodiments of the present invention include modems for wired dial-up communications, Ethernet (IEEE 802.3) adapters for wired data communications network communications, and 802.11 adapters for wireless data communications network communications.

Figure 2:
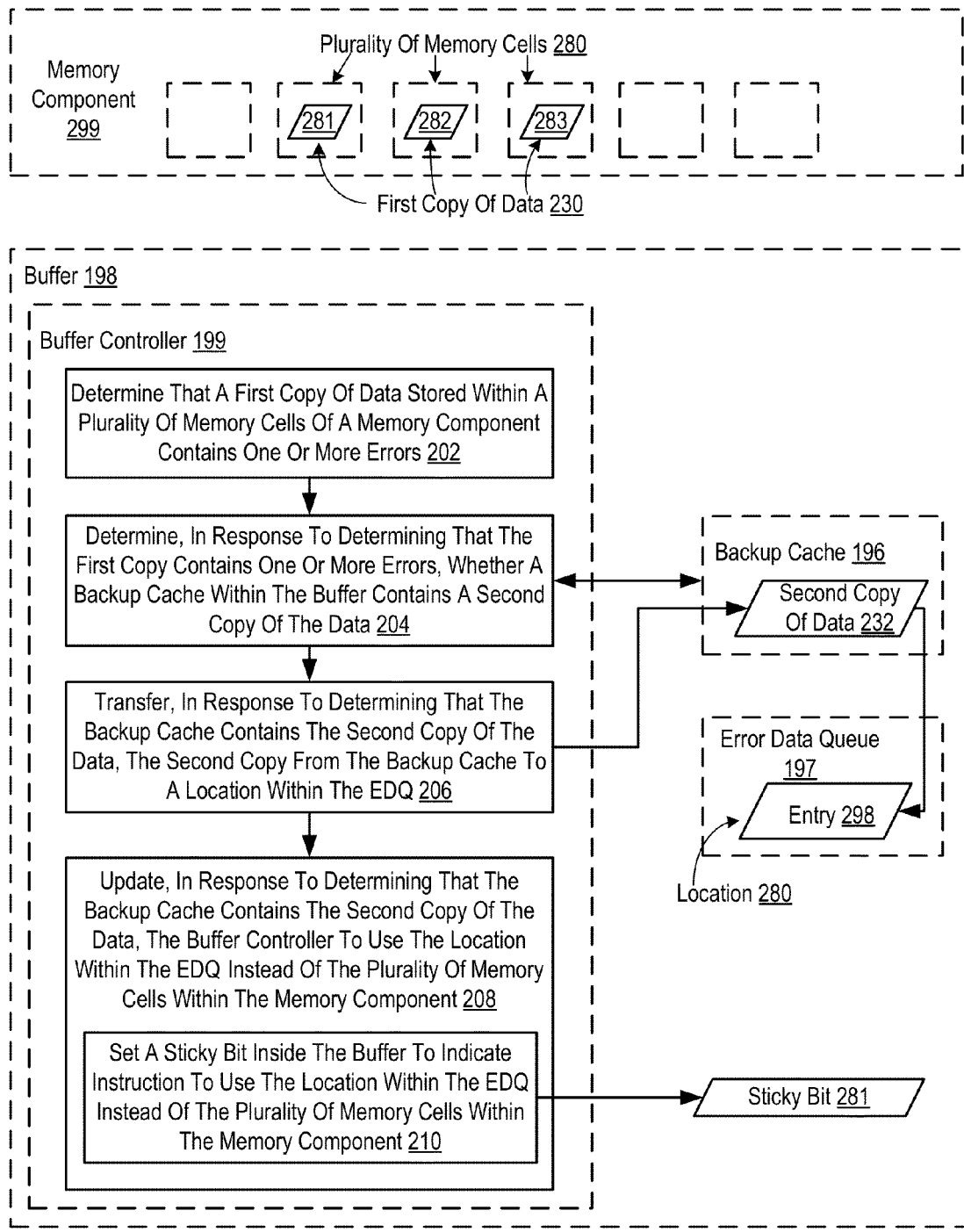
FIG. 2 sets forth a flow chart illustrating an exemplary method for using a buffer to replace failed memory cells in a memory component according to embodiments of the present invention.

For further explanation, FIG. 2 sets forth a flow chart illustrating an exemplary method for using a buffer to replace failed memory cells in a memory component according to embodiments of the present invention. The method of FIG. 2 includes determining (202), by a buffer controller (199), that a first copy (230) of data stored within a plurality of memory cells (284) of a memory component (299) containing one or more errors. A memory component may be a memory subsystem, such as RAM (168), a memory module, a chip within a memory module, or any other type of memory component of a memory system. Determining (202) that a first copy (230) of data contains one or more errors may be carried out by receiving a command to read the first copy from the plurality of memory cells; reading the first copy from the plurality of memory cells; and identifying errors in individual memory cells (281-283) storing the first copy. Determining that the first copy (230) of data contains one or more errors may also include receiving, by the buffer controller, an indication from the memory controller that the plurality of memory cells include one or more errors. That is, either the memory controller or the buffer controller may determine if the plurality of memory cells have failed. Readers of skill in the art will realize that the buffer controller may be part of the memory controller and any component of the buffer may be located in a variety of locations within a computer.

Identification of an error in any of the bits may be ascertained by a variety of error detection methods, such as for example, a detecting algorithm or by use of "On-demand scrubbing." On-demand scrubbing can be initiated by scrubbing regularly in time or initiating scrubbing in response to a particular event, such as reaching a threshold limit on buffer usage.

The method of FIG. 2 includes determining (204), in response to determining that the first copy (230) contains one or more errors, by the buffer controller (199), whether a backup cache (196) within the buffer (198) contains a second copy (232) of the data. Determining (204) whether a backup cache (196) within the buffer (198) contains a second copy (232) of the data may be carried out by querying a cache directory to determine if data corresponding to the first copy is stored in the backup cache.

The method of FIG. 2 includes transferring (206), in response to determining that the backup cache (196) contains the second copy (232) of the data, the second copy (232) from the backup cache (196) to a location (280) within an error data queue (EDQ) (197) within the buffer (198). Transferring (206) the second copy (232) from the backup cache (196) to a location (280) within an error data queue (EDQ) (197) within the buffer (198) may be carried out by creating an entry (298) within the EDQ at location (280).

The method of FIG. 2 also includes updating (208), in response to determining that the backup cache (196) contains the second copy (232) of the data, the buffer controller (199) to use the location within the EDQ (197) instead of the plurality of memory cells (284) within the memory component (299). Updating (208), in response to determining that the backup cache (196) contains the second copy (232) of the data, the buffer controller (199) to use the location within the EDQ (197) instead of the plurality of memory cells (284) within the memory component (299) may be carried out by updating a buffer controller directory. Updating (208), in response to determining that the backup cache (196) contains the second copy (232) of the data, the buffer controller to use the location within the EDQ (197) instead of the plurality of memory cells (284) within the memory component (299) may also include setting (210) a sticky bit (281) inside the buffer (198) to indicate instruction to use the location (280) within the EDQ (197) instead of the plurality (280) of memory cells within the memory component (299). In addition to storing data, each entry of an EDQ may also have a corresponding 'tag' and 'sticky bit.' A 'tag' may be used to indicate a complete hierarchy of information regarding a memory module being accessed in association with the data. A 'sticky bit' may be used to indicate a source for the data. For example, when encountered with more than one bit failure in a data block, the sticky bit may be set to source the data from the buffer instead of from the plurality of memory cells in the memory component. In addition, the sticky bit may also indicate to a buffer controller that a particular entry cannot be replaced from the buffer. That is, when a processor issues a command to access the failed memory cells, the buffer controller instead access the EDQ (i.e., the memory is 'swapped' for the buffer). Thus, according to embodiments of the present invention, the buffer (198) protects the processor (191) and memory controller (115) from 'memory holes.' As further described in FIG. 3, the buffer protects from these memory holes in a variety of different situations including during frequent reads (i.e., a second copy of data is stored in a backup cache) and during non-frequent reads (i.e., a second copy of the data has been flushed from the backup cache).

Figure 3:
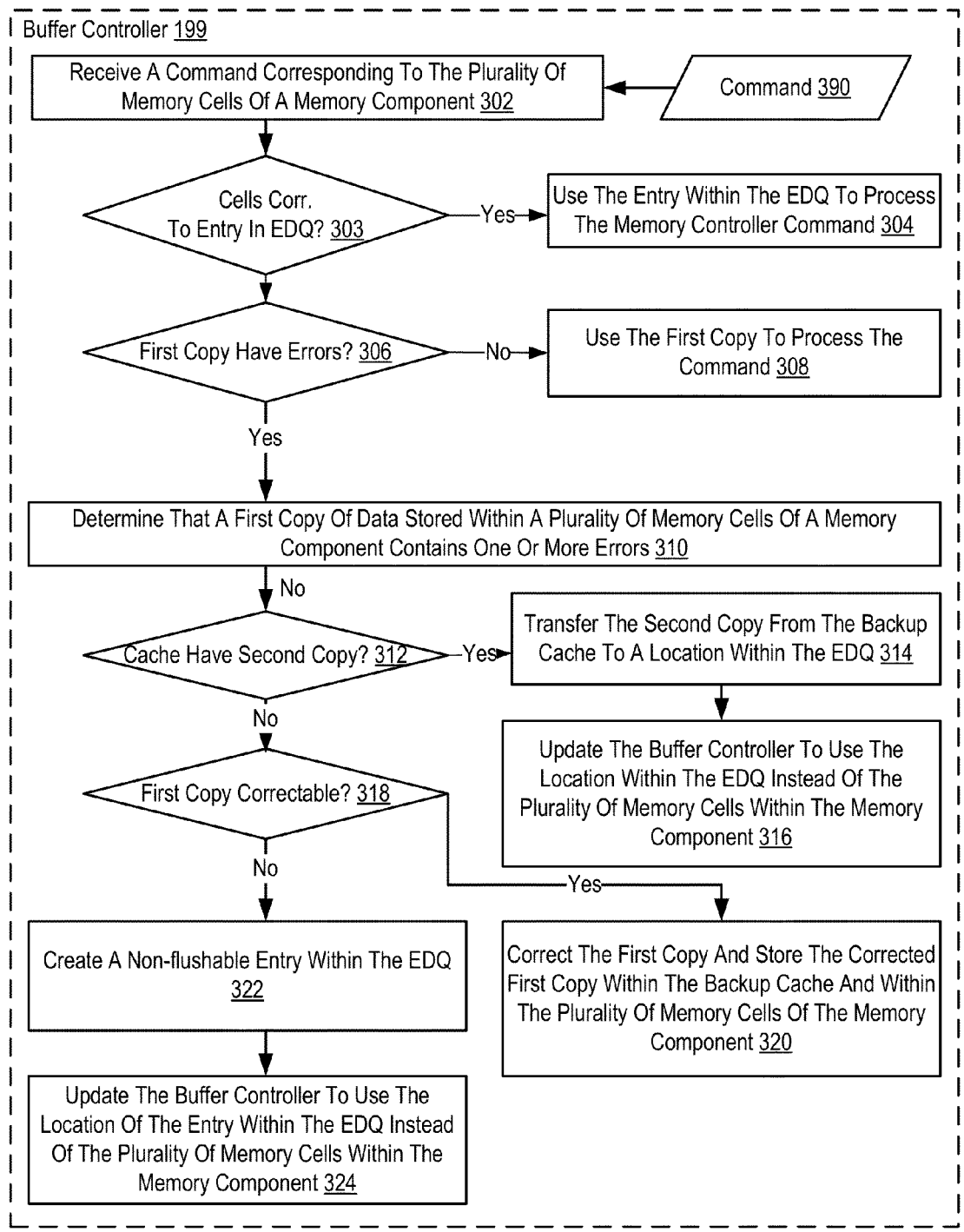
FIG. 3 sets forth a flow chart illustrating a further exemplary method for using a buffer to replace failed memory cells in a memory component according to embodiments of the present invention.

For further explanation, FIG. 3 sets forth a flow chart illustrating a further exemplary method for using a buffer to replace failed memory cells in a memory component according to embodiments of the present invention. The method of FIG. 3 includes receiving, by a buffer controller (199), a command (390) corresponding to the plurality of memory cells of a memory component. A command may be a read or write data command. Receiving, by the buffer controller (199), a command (390) may be carried out by receiving the command from a processor or memory controller.

The method of FIG. 3 also includes determining (303) whether the cells indicated within the command (390) correspond to an entry within an error data queue (EDQ) within a buffer. Determining (303) whether the cells within the command (390) correspond to an entry within an error data queue (EDQ) within a buffer may be carried out by associating the cells with an address; looking up the address within a buffer directory; and if the address is associated with an entry, corresponding the individual cells to the entry. For example, if a 'sticky bit' in an entry is set, then the corresponding location in the EDQ is used instead of the address within the memory component. That is, the memory is 'swapped.'

If the cells do correspond to an entry within the EDQ, the method of FIG. 3 continues by using (304) the entry within the EDQ to process the command (390). Using (304) the entry within the EDQ to process the command (390) may be carried out by retrieving data within the EDQ or writing data to an entry within the EDQ.

If the cells do not correspond to an entry within the EDQ, the method of FIG. 3 continues by determining (306) whether the first copy contains one or more errors. Determining (306) whether the first copy contains one or more errors may be carried out by receiving a command to read the first copy from the plurality of memory cells; reading the first copy from the plurality of memory cells; and identifying errors in individual memory cells storing the first copy. Determining that the first copy (230) of data contains one or more errors may also include receiving, by the buffer controller, an indication from a memory controller that the plurality of memory cells include one or more errors. Identification of an error in any of the bits may be ascertained by a variety of error detection methods, such as for example, a detecting algorithm or by use of "on-demand scrubbing." On-demand scrubbing can be initiated by scrubbing regularly in time or initiating scrubbing in response to a particular event, such as reaching a threshold limit on buffer usage.

If the first copy does not contain errors, the method of FIG. 3 continues by using (308) the first copy to process the command (390). Using (308) the first copy to process the command (390) may be carried out by reading the first copy from the memory component or writing data to the plurality of memory cells of the memory component.

If the first copy does contain errors, the method of FIG. 3 continues by determining (310), by the buffer controller (199), that a first copy of data stored within a plurality of memory cells of the memory component contains one or more errors. Determining, by the buffer controller (199), that a first copy of data contains one or more errors may be carried out by the buffer controller (199) detecting one or more errors within the first copy.

The method of FIG. 3 also includes determining (312), by the buffer controller, whether a backup cache includes a second copy of the data. Determining (312), by the buffer controller, whether a backup cache includes a second copy of the data may be carried out by querying a cache directory to determine if data corresponding to the first copy is stored in the backup cache.

If the backup cache does include a second copy of the data, the method of FIG. 3 includes transferring (314) the second copy from the backup cache to a location within the EDQ. Transferring (314) the second copy from the backup cache to a location within the EDQ may be carried out by creating an entry within the EDQ. In addition to storing data, each entry may also have a corresponding 'tag' and 'sticky bit.' A 'tag' may be used to indicate a complete hierarchy of information regarding a memory module being accessed in association with the data. A 'sticky bit' may be used to indicate a source for the data. For example, when encountered with more than one bit failure in a data block, the sticky bit may be set to source the data from the buffer instead of from memory. In addition, the sticky bit may indicate to a buffer controller that a particular entry cannot be replaced from the buffer.

If the backup cache does include a second copy of the data, the method of FIG. 3 also includes updating (316) the buffer controller such that any requests or commands from a processor or memory controller indicating the plurality of memory cells within the memory component are directed to the location within the EDQ. Updating (316) the buffer controller may be carried out by setting a sticky bit within a buffer or updating a buffer controller directory.

If the backup cache does not include a second copy of the data, the method of FIG. 3 includes determining (318) whether a first copy of the data retrieved from the plurality of memory cells is correctable. Determining whether a first copy of the data is correctable may be carried out by determining the type of error within the first copy. For example, an error of one bit within a byte of data may be correctable whereas two or more bit errors may be uncorrectable. Determining what is correctable and what is not correctable may be dependent upon the error correction algorithms and methods employed.

If the errors in the first copy are correctable, the method of FIG. 3 continues by correcting (320) the first copy and storing the corrected first copy at the backup cache and the plurality of memory cells in the memory component. Correcting (320) the first copy and storing the corrected first copy may be carried out by using error correcting codes (ECC) to correct the errors. The buffer controller (199) may then read the plurality of memory cells again looking to see if the error has been corrected. If, on the reread of the memory cells, the buffer controller (199) determines that no error exists, then the error was a transient error and the buffer controller (199) may log the error as a soft failure or transient error.

If the errors in the first copy are not correctable, the method of FIG. 3 continues by creating (322) a non-flushable entry within the EDQ. Creating (322) a non-flushable entry within the EDQ may be carried out by establishing a location within the EDQ to store data, a tag, and a sticky bit. A 'sticky bit' may be used to indicate a source for the data. For example, when encountered with more than one bit failure in a data block, the sticky bit may be set to source the data from the buffer instead of from the plurality of memory cells in the memory component. In addition, the sticky bit may also indicate to a buffer controller that a particular entry cannot be replaced from the buffer. That is, the sticky bit indicates that the entry is not to be flushed. An uncorrectable error may result in the memory controller logging the error as a hard error. Logs of the memory controller may be reviewed periodically to determine which memory modules to replace.

The method of FIG. 3 also includes if the errors in the first copy are not correctable, updating (324) the buffer controller such that any requests or commands from a processor or memory controller indicating the address of the failed memory cells are directed to the entry of the EDQ. Updating (324) the buffer controller such that any requests indicating the address of the memory cells are directed to the entry of the EDQ may be carried out by setting a sticky bit within a buffer.

Figure 4:
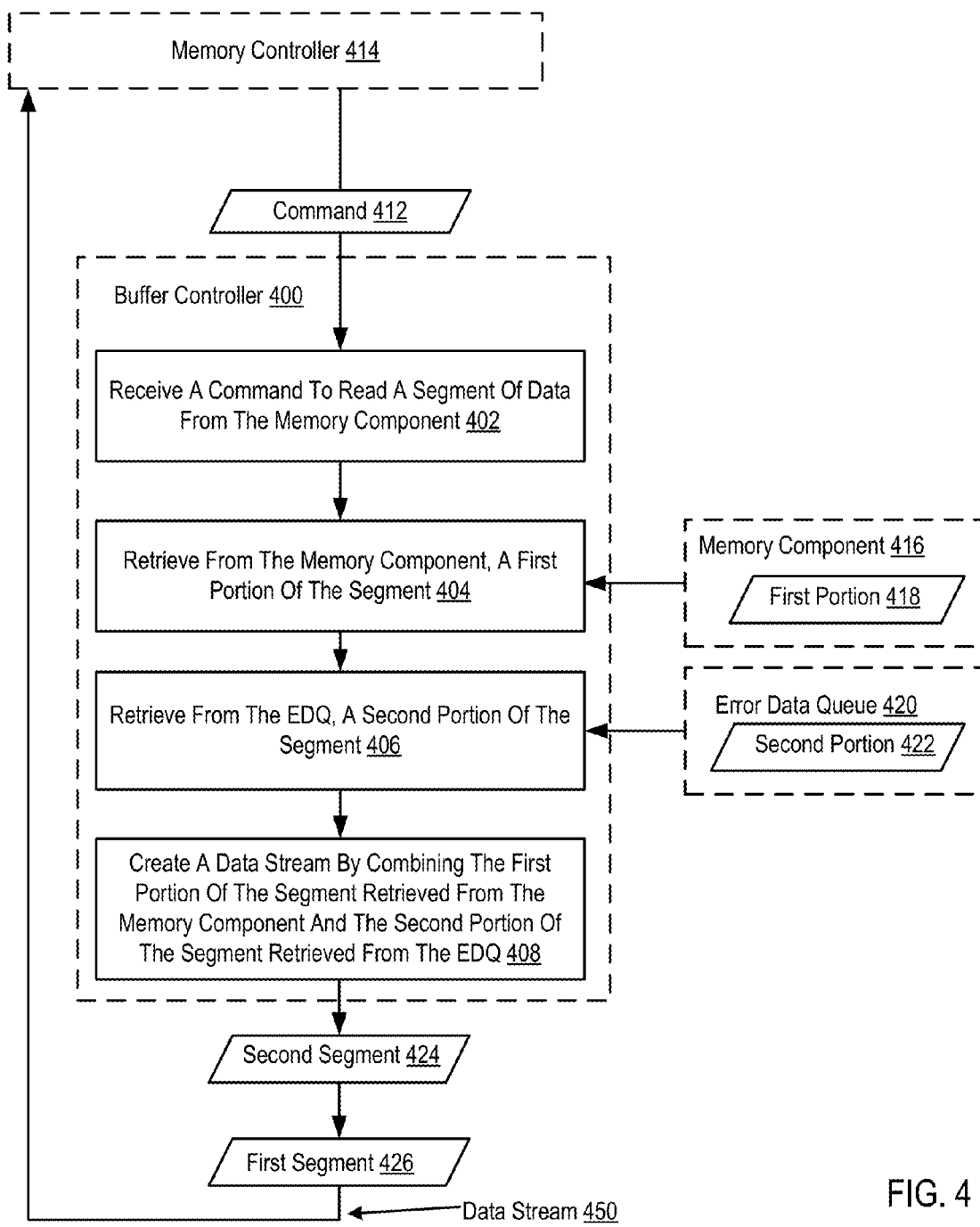
FIG. 4 sets forth a flow chart illustrating a further exemplary method for using a buffer to replace failed memory cells in a memory component according to embodiments of the present invention.

For further explanation, FIG. 4 sets forth a flow chart illustrating a further exemplary method for using a buffer to replace failed memory cells in a memory component according to embodiments of the present invention. The method of FIG. 4 includes receiving (402), by the buffer controller (400), a command (412) to read a segment of data from the memory component (416). Receiving (402) a command (412) to read a segment of data from the memory component (416) may be carried out by receiving from a memory controller, a command to read data from the memory component.

The method of FIG. 4 includes in response to receiving the command (412) to read the segment of data from the memory component (416), retrieving (404), by the buffer controller (400), from the memory component (416), a first portion (418) of the segment. Retrieving (404), by the buffer controller (400), from the memory component (416), a first portion (418) of the segment may be carried out by reading the first portion from the memory component.

The method of FIG. 4 also includes in response to receiving the command (412) to read the segment of data from the memory (416), retrieving (406) from the EDQ (420), a second portion (422) of the segment. Retrieving (406) from the EDQ (420), a second portion (422) of the segment may be carried out by reading the second portion from the EDQ.

The method of FIG. 4 also includes creating (408), by the buffer controller (400), a data stream (450) by combining the first portion (426) of the segment retrieved from the memory component (416) and the second portion (422) of the segment retrieved from the EDQ (420). Creating (408), by the buffer controller (400), a data stream (450) by combining the first portion (426) of the segment retrieved from the memory component (416) and the second portion (422) of the segment retrieved from the EDQ (420) may be carried out by using memory logic that have the capability to append/merge data from both the memory component (416) and the EDQ (420) to present to a next layer as a complete data stream.

Figure 5:
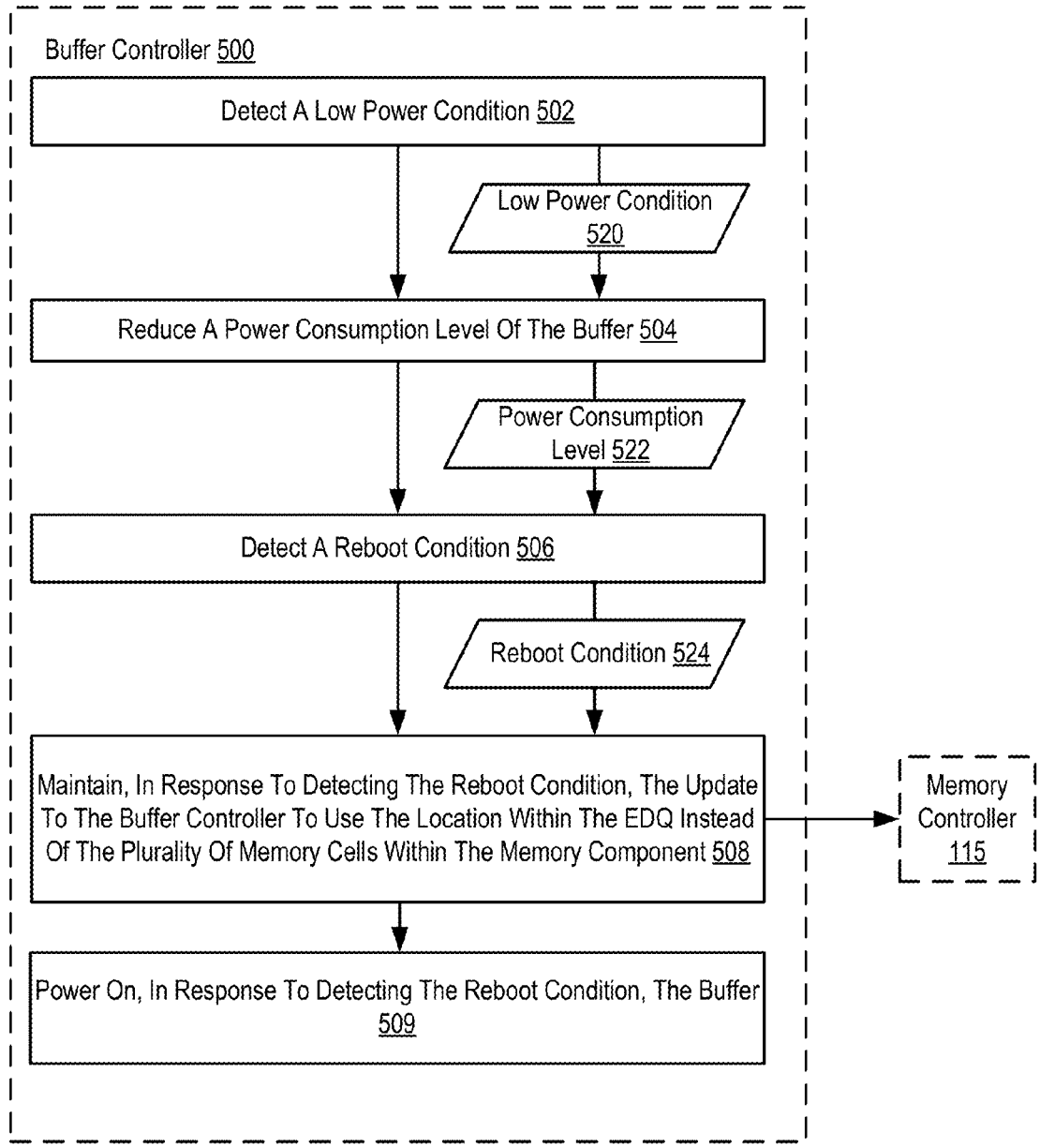
FIG. 5 sets forth a flow chart illustrating a further exemplary method for using a buffer to replace failed memory cells in a memory component according to embodiments of the present invention.

For further explanation, FIG. 5 sets forth a flow chart illustrating a further exemplary method for using a buffer to replace failed memory cells in a memory component according to embodiments of the present invention. The method of FIG. 5 includes detecting (502), by the buffer controller (500), a low power condition (520). Detecting (502), by the buffer controller (500), a low power condition (520) may be carried out by receiving an indication from the memory controller that the computer (152) desires one or more components of the computer (152) to reduce power.

The method of FIG. 5 also includes in response to detecting the low power condition (520), reducing (504), by the buffer controller (500), a power consumption level (522) of a buffer. Reducing (504), by the buffer controller (500), a power consumption level (522) of a buffer may be carried out by shutting down or turning off the buffer.

The method of FIG. 5 includes detecting (506), by the buffer controller (500), a reboot condition (524). Detecting (506), by the buffer controller (500), a reboot condition (524) may be carried out by receiving an indication that the system comprising the buffer controller is restarting.

The method of FIG. 5 also includes in response to detecting the reboot condition (524), maintaining (508), by the buffer controller (500), the update to the buffer controller to use the location within the EDQ instead of the plurality of memory cells within the memory component. Maintaining (508), by the buffer controller (500), the update to the buffer controller to use the location within the EDQ instead of the plurality of memory cells within the memory component may be carried out by creating or loading one or more entries into the EDQ or a buffer directory that corresponds to the EDQ.

The method of FIG. 5 includes in response to detecting the reboot condition (524), powering on (509), by the buffer controller (500), the buffer. Powering on (509), by the buffer controller (500), the buffer may be carried out by providing electrical power to one or more circuits of the buffer.

Exemplary embodiments of the present invention are described largely in the context of a fully functional computer system for using a buffer to replace failed memory cells in a memory component. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by computer program instructions on a computing device that controls a buffer,
determining that a first copy of data stored at a first location within a plurality of memory cells of a memory component contains one or more errors;
in response to determining that the first copy contains one or more errors, determining whether a backup cache within the buffer contains a second copy of the data;
in response to determining that the backup cache does not contain the second copy of the data, determining whether the one or more errors contained in the first copy are correctable; and
if the one or more errors are not correctable, creating a non-flushable entry within an error data queue (EDQ) and updating the computing device to use a location of the non-flushable entry within the EDQ instead of the first location within the plurality of memory cells.

2. The method of claim 1 further comprising in response to determining that the backup cache contains the second copy of the data, transferring the second copy from the backup cache to a particular location within an error data queue (EDQ) within the buffer and updating the computing device to use the particular location within the EDQ instead of the plurality of memory cells within the memory component;
wherein updating the computing device to use the particular location within the EDQ instead of the plurality of memory cells within the memory component includes setting a sticky bit inside the buffer to indicate an instruction to use the particular location within the EDQ instead of the plurality of memory cells within the memory component.

3. The method of claim 1 further comprising:
if the one or more errors are correctable, correcting the first copy and storing the corrected first copy within the backup cache and within the plurality of memory cells of the memory component.

4. The method of claim 1, wherein the buffer is part of the memory controller.

5. The method of claim 1 further comprising:
receiving from a memory controller a command to read a segment of data from the memory component;
in response to receiving the request to read the segment of data from the memory component, retrieving from the memory component, a first portion of the segment and retrieving from the EDQ, a second portion of the segment; and
creating a data stream by combining the first portion of the segment retrieved from the memory component and the second portion of the segment retrieved from the EDQ.

6. The method of claim 1 further comprising:
detecting a low power condition; and
in response to detecting the low power condition, reducing a power consumption level of the buffer.

7. The method of claim 2 further comprising:
detecting a reboot condition;
in response to detecting the reboot condition, maintaining an update to the computing device to use the particular location within the EDQ instead of the plurality of memory cells within the memory component; and
in response to detecting the reboot condition, powering on, the buffer.

8. The method of claim 1 wherein the EDQ contains a plurality of entries, at least two of the entries correspond to different memory modules.

9. The method of claim 1, wherein the memory component includes at least one memory module that is one of a dual in-line memory module (DIMM) and a single in-line memory module (SIMM).

10. The method of claim 1, wherein the backup cache is at least one of content addressable cache and address mapped cache.

11. A data processing system comprising a buffer that includes:
a backup cache;
an error data queue; and
a computing device that controls a buffer, the computing device configured to carry out the steps of:
determining that a first copy of data stored at a first location within a plurality of memory cells of a memory component contains one or more errors;
in response to determining that the first copy contains one or more errors, determining whether a backup cache within the buffer contains a second copy of the data;

in response to determining that the backup cache does not contain the second copy of the data, determining whether the one or more errors contained in the first copy are correctable; and if the one or more errors are not correctable, creating a non-flushable entry within an error data queue (EDQ) and updating the computing device to use a location of the non-flushable entry within the EDQ instead of the first location within the plurality of memory cells.

12. The system of claim 11 wherein the computing device is further configured to carry out the steps of in response to determining that the backup cache contains the second copy of the data, transferring the second copy from the backup cache to a particular location within an error data queue (EDQ) within the buffer and updating the computing device to use the particular location within the EDQ instead of the plurality of memory cells within the memory component;

wherein updating the computing device to use the particular location within the EDQ instead of the plurality of memory cells within the memory component includes setting a sticky bit inside the buffer to indicate an instruction to use the particular location within the EDQ instead of the plurality of memory cells within the memory component.

13. The system of claim 11, wherein the computing device is further configured to carry out the steps of:

if the one or more errors are correctable, correcting the first copy and storing the corrected first copy within the backup cache and within the plurality of memory cells of the memory component.

14. The system of claim 11 further comprising a memory controller, wherein the buffer is part of the memory controller.

15. The system of claim 13, wherein the computing device is further configured to carry out the steps of:

receiving from a memory controller, a command to read a segment of data from the memory;

in response to receiving the request to read the segment of data from the memory component, retrieving from the memory component, a first portion of the segment and retrieving from the EDQ, a second portion of the segment; and creating a data stream by combining the first portion of the segment retrieved from the memory component and the second portion of the segment retrieved from the EDQ.

16. The system of claim 11, wherein the computing device is further configured to carry out the steps of:

detecting a low power condition; and in response to detecting the low power condition, reducing a power consumption level of the buffer.

17. The system of claim 11, wherein the computing device is further configured to carry out the steps of:

detecting a reboot condition;

in response to detecting the reboot condition, maintaining an update to the computing device to use the particular location within the EDQ instead of the plurality of memory cells within the memory component; and in response to detecting the reboot condition, powering on the buffer.

18. The system of claim 11, wherein the EDQ contains a plurality of entries, at least two of the entries correspond to different memory modules.

19. The system of claim 11, wherein the memory component includes at least one memory module that is one of a dual in-line memory module (DIMM) and a single in-line memory module (SIMM).

20. The system of claim 11, wherein the backup cache is at least one of content addressable cache and address mapped cache.

* * * * *